April 18, 1961     R. E. WEGER     2,980,447
MANIFOLD VIOLATION AND COMPLAINT FORM
Filed Dec. 22, 1958     3 Sheets-Sheet 1

INVENTOR.
RONALD E. WEGER
BY
Woodhams, Blanchard and Flynn
ATTORNEYS

April 18, 1961  R. E. WEGER  2,980,447
MANIFOLD VIOLATION AND COMPLAINT FORM
Filed Dec. 22, 1958  3 Sheets-Sheet 2

INVENTOR.
RONALD E. WEGER
BY
Woodhams, Blanchard and Flynn
ATTORNEYS

April 18, 1961 R. E. WEGER 2,980,447
MANIFOLD VIOLATION AND COMPLAINT FORM
Filed Dec. 22, 1958 3 Sheets-Sheet 3

| CASE NO. | DOCKET NO. | PAGE NO. |
|---|---|---|
| DATE | COURT ACTION AND OTHER ORDERS | |

THE WITHIN COMPLAINT HAS BEEN EXAMINED AND THERE IS PROBABLE CAUSE FOR FILING THE SAME LEAVE IS HEREBY GRANTED TO FILE THE COMPLAINT. COMPLAINT FILED_____.

BAIL FIXED AT $_____ OR CASH DEPOSIT OF $_____

SIGNATURE OF PERSON GIVING BAIL

SIGNATURE OF PERSON TAKING BAIL

FINE IN THE AMT OF $_____ RECEIVED AS REQUIRED BY COURT SCHEDULE.

SIGNATURE OF CLERK

CONTINUANCE TO _____ REASON _____
CONTINUANCE TO _____ REASON _____
WARRANT ISSUED_____
WARRANT SERVED_____
TRIAL BY COURT (JURY) PLEA _____
DEFENDANT ARRAIGNED_____ WAIVES TRIAL BY JURY_____
FINDING OF COURT_____
FINDING OF JURY_____
THE COURT THEREFORE, ENTERS THE FOLLOWING ORDER:
 FINED $_____
 JAILED_____ DAYS IN_____
 PROBATION_____
FIRST OFFENSE WRITTEN WARNING
TRAFFIC SCHOOL
DRIVERS LICENSE SUSPENDED FOR _____ DAYS

SIGNATURE OF JUDGE

TESTMONY-JUDGES NOTES: (FOR OTHER COURT ORDERS):

APPEAL BOND OF $_____ | FILED FOR_____
APPEAL TO _____ COURT

FIG. 4

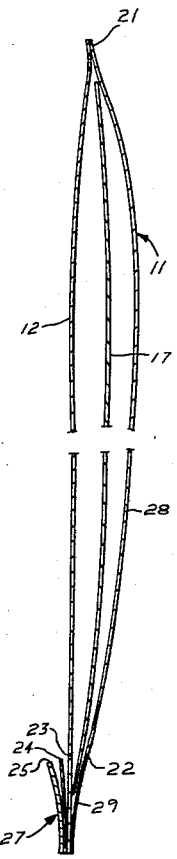

FIG. 5

INVENTOR.
RONALD E. WEGER
BY
Woodhams Blanchard and Flynn
ATTORNEYS

United States Patent Office 2,980,447
Patented Apr. 18, 1961

2,980,447

MANIFOLD VIOLATION AND COMPLAINT FORM

Ronald E. Weger, 3218 S. Cambridge Road,
Lansing, Mich.

Filed Dec. 22, 1958, Ser. No. 782,273

1 Claim. (Cl. 282—22)

This invention relates in general to a manifold form adapted for use by law enforcement agencies, and more particularly, to a type threeof including summons, police record, complaint, and court record combined in a single unit including impression transferring means between the adjacent sheets of said manifold which are arranged for easy use and separation from each other. This application is a continuation-in-part of my application Serial No. 579,546, filed April 20, 1956, now abandoned.

The violation form described herein was developed for the purpose of overcoming record problems which are characteristic to police and municipal departments, civil courts and state licensing authorities with particular regard to traffic violations. Thus, for convenience of description and for illustrative purposes, the invention is disclosed herein as a traffic violation form. However, it will be recognized that the substance of this form can be adapted to other uses, such as a complaint for minor violations of many types.

Many forms of traffic tickets have been devised to provide a combined summons and record of the cause for issuance of the summons. However, these tickets have been insufficient in scope or unsatisfactory for a variety of other reasons, some of which were the result of the physical structure of the ticket. In virtually all prior constructions, no provision was made for recording the disposition of the complaint made by the court. Thus it has been necessary to record the court's action on separate papers or forms which have required special, time-consuming preparation and have complicated the record keeping operation. Also, it has been necessary for the court to docket the complaint arising out of each violation, which presently requires additional paper work and records.

In most existing forms relating to violations, an insufficient number of sheets have been provided, thereby unduly complicating the process of informing the proper public officials as to the occurrence and disposition of the violation. In other instances, the structures of the forms have been so complex that the proper execution thereof by the arresting officer has been a tedious and mistake-provoking job.

Accordingly, it has been an object of this invention to provide an improved traffic violation form comprising a summons, police record, complaint, and record of the court's disposition of the complaint.

It has been a further object of this invention to provide an improved form, as aforesaid, which is convenient and simple to fill out, and which has sufficient, built-in rigidity that it can be written upon without further or special backing while being held in the hand of the arresting officer.

It has been a further object of this invention to provide an improved form, as aforesaid, in which a plurality of sheets having the necessary printed indicia thereon are secured together to form a set which can be conveniently used by the arresting officer, which is so arranged that said officer can easily determine which sheet is the summons and must, therefore, be served upon the violator and which sheets must be forwarded to the court as a complaint and for the purpose of recording the disposition made of the complaint by the court.

Other objects and advantages will become apparent to persons acquainted with articles of this type upon reading the following description and inspecting the accompanying drawings, in which:

Figure 4 is a rear view of the first sheet of the form.

Figure 5 is a sectional view taken along the line V—V in Figure 4, before the stub is removed therefrom.

Figures 1, 6:
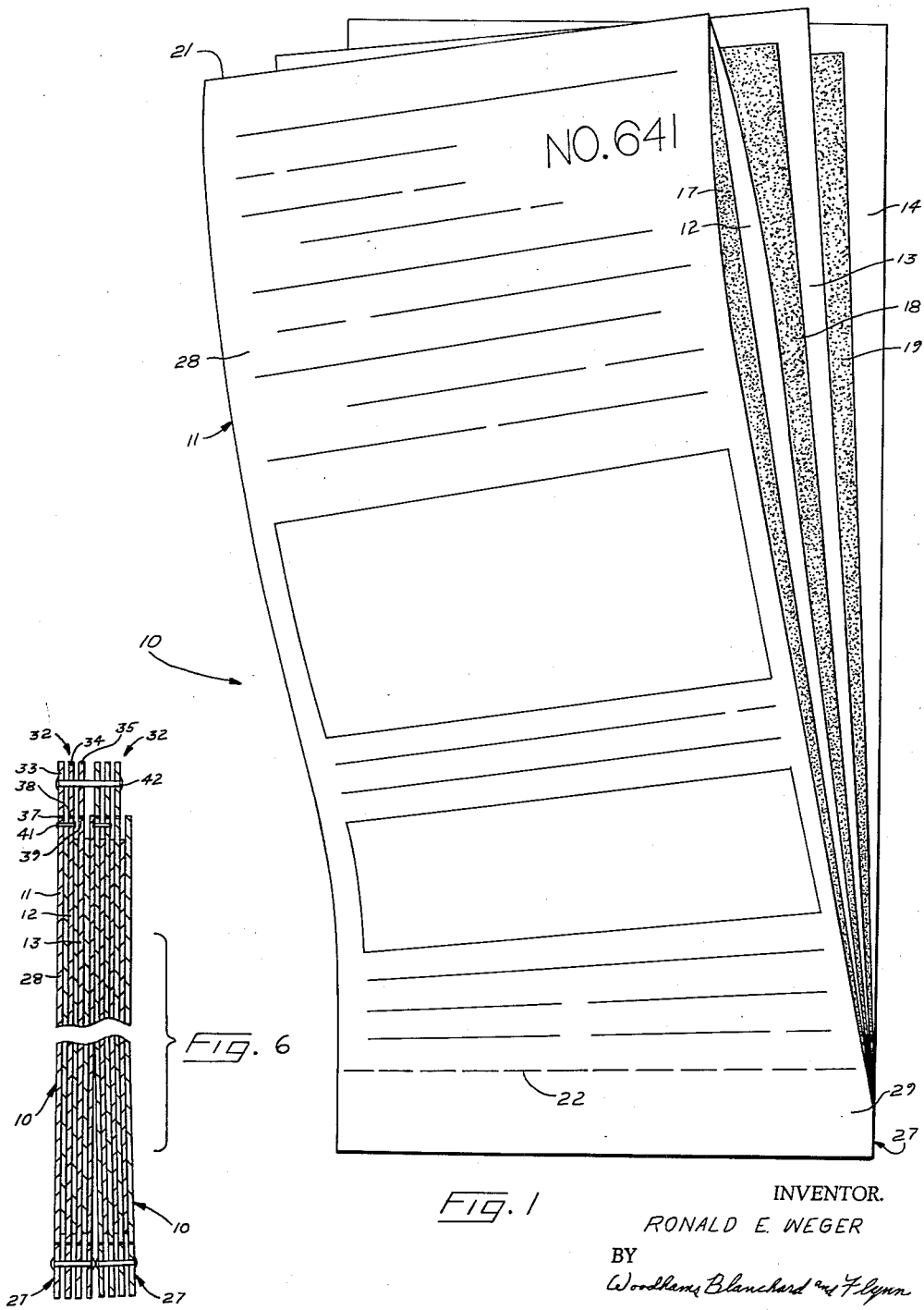
Figure 1 is a front, partially open view of a manifold form embodying the invention.
Figure 6 is a broken, sectional view substantially as taken along the line VI—VI in Figure 2 and showing a modified construction.

For the purpose of convenience in description, the terms "upper," "lower," "front" and "rear" will have reference to the form embodying the invention, and the individual sheets thereof, as appearing in Figure 1. The terms "inner," "outer" and derivatives thereof will have reference to the geometric center of said form and parts thereof.

General description

The objects and purposes of the invention, including those set forth above, have been met by providing a manifold form having a plurality, here 4, of sheets secured with respect to each other near one edge thereof. Each of said sheets contains selected indicia on both sides thereof, and each pair of adjacent indicia-bearing sheets is separated by an impression transferring sheet, such as a sheet of carbon paper. The indicia-bearing sheet at one end of the manifold is substantially thicker than the other indicia-bearing sheets and, as a result of the added thickness, provides adequate backing to effect legible impressions on all of the indicia-bearing sheets when the first sheet is written upon. The impression transferring sheets are secured near their lower ends to one of the adjacent indicia-bearing sheets and the front two indicia-bearing sheets are secured to each other along their upper edges. All four indicia-bearing sheets are provided with perforated severance lines near their lower edges, whereby the upper portions of the sheets, which receive all of the recorded information, can be quickly and easily removed from the lower portions thereof.

Detailed construction

The traffic violation form 10 (Figure 1) which is described in detail herein for illustrative purposes, is comprised of at least four indicia-bearing sheets 11, 12, 13, and 14 which are preferably substantially identical in size and shape. The arrangement and content of the indicia used on these sheets have been developed after many years of research and study. Said indicia-bearing sheets are secured with respect to each other near their lower edges by any suitable means, such as an adhesive, staples, stitching or the like. Impression transferring means, such as the three carbon paper sheets 17, 18 and 19, are inserted respectively between at least the upper separated portions of each pair of adjacent indicia-bearing sheets 11 to 14, inclusive. Said impression transferring sheets are arranged with their impression transferring sides facing the indicia sheets 12, 13 and 14, respectively. In this particular embodiment, the transfer sheets 17, 18 and 19 are secured to the indicia sheets 11, 12 and 13, respectively, by means of adhesive disposed upon their front, uncoated sides adjacent to the lower edges thereof.

The rear sheet 14 is preferably substantially stiffer and thicker than the front three sheets so that it provides a backing for the entire form and thereby facilitates the writing of certain necessary information on the front sheet 11, even when the form is handheld. Moreover, the rear sheet 14 improves the transfer of such writing to the indicia-bearing sheets 12, 13 and 14 by the impression transferring sheets disposed adjacent thereto. However, under some circumstances it may be desirable to provide a rear indicia-bearing sheet which has substantially the same structure as the other indicia sheets, and is identified by other means, such as its color.

Figures 2, 3:
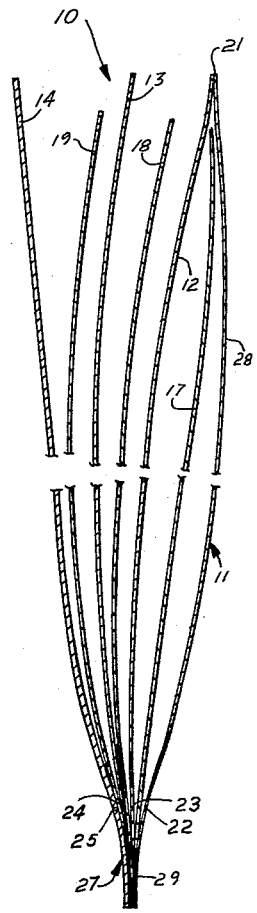
Figure 2 is a detailed, front view of the first sheet of the form.
Figure 3 is a sectional view of the form taken along the line III—III in Figure 2.

The upper edges of the front two indicia-bearing sheets 11 and 12 are secured to each other along a severance line 21 (Figures 1 and 3). Said indicia-bearing sheets 11 to 14, inclusive, are provided with perforated severance lines 22 to 25, respectively, which lines are spaced slightly above the portions of their sheets which are secured together, and preferably above the points where the carbon papers 17, 18, and 19 are secured to the sheets 11, 12, and 13, respectively. Accordingly, when the upper portions of the indicia sheets 11 through 14, inclusive, are removed from the lower portions thereof along the severance lines 22 through 25, inclusive, the three carbon papers 17, 18 and 19 will remain secured to the stub 27 which comprises the lower portions of said indicia sheets.

The majority of indicia appearing on the front sides of the indicia sheets 11 through 14, inclusive, may be substantially identical. Accordingly, such common indicia will be described in detail with respect to the front side of the first sheet 11 and such will be understood to describe the substance of the indicia appearing on the front sides of the other three indicia-bearing sheets 12, 13 and 14, in the corresponding portions thereof.

The sheet 11, which is rectangular and elongated, has a relatively large upper portion 28 and a relatively small lower portion 29 which portions are separated by the severance line 22. The lower portions 29 of each of said sheets, which comprise the stub 27, are connected together as stated above. The indicia printed on the front surface of indicia sheet 11 (Figure 2), relates to the identification of the traffic violator, the nature of the violation, the date on which the violator is to appear in court, the notarized signature of the arresting officer and an identification number applying to the particular complete form. Sheet 11 is distinguished from the other sheets by the designation "complaint" which appears on its front side near the top thereof.

The front side of sheet 12 differs from the other indicia sheets by the designation "the police record" and sheet 14 is marked on its front side as the "summons," which is served on the violator. Thus, the "complaint" and the "abstract of the court record for the state licensing authority" are, in this particular embodiment, attached at both their upper and lower ends, whereas the sheets 13 and 14 are secured with respect to each other only at their lower ends.

The rear sides of indicia sheets 11 and 12 contain, in this particular embodiment, indicia relating to the disposition by the court of the case arising out of the complaint and may take the form shown in Figure 4. More specifically, the reverse sides of sheets 11 and 12, which comprise the "complaint" and the copy for the state licensing authority, contain a brief abstract of the court action and other orders or records of the court having jurisdiction over the case.

The reverse side of sheet 13 is reserved for use by the law enforcement agency wherein the traffic violation has occurred and contains a brief description of the disposition of the case by the court and space for indicating pertinent information, such as defects in the vehicle or other facts of importance noted by the arresting officer. The reverse or rear side of the sheet 14, which is the traffic violator's summons or "ticket," contains instructions to the traffic violator, such as the recommended or required action which the violator should or must take as a result of having been served with the summons, the manner for pleading guilty to a minor traffic violation, which does not require a hearing, or any other pertinent information for the violator.

A plurality of forms 10 may be separably jointed together to provide a book of forms from which one form at a time may be removed when needed. This can be accomplished by connecting the stubs 27 by any convenient means, such as by an adhesive or stapling.

As shown in Figure 6, each form 10 may have a second stub 32 at the opposite end thereof from the stub 27 (Figure 1). Said stub 32 (Figure 6) is comprised of extensions 33, 34 and 35 on the sheets 11, 12 and 13, respectively, in this particular embodiment. Sheet 14 does not have such an extension and is, therefore, of smaller length than sheets 11, 12 and 13. The extensions are separably connected to their sheets along the severance lines 37, 38 and 39, respectively. The portions 28 of the sheets 11 and 12 are connected together, as by an adhesive 41, adjacent to, and inwardly of, the severance lines 37 and 38, respectively. Thus, the stubs 32 on each form can be connected together by any convenient means, such as staples 42 or an adhesive, to provide a book of forms 10. Moreover, because each form 10 is held as a unit by the stub 27, a single form can be quickly selected from a book of forms and removed when needed.

*Use and operation*

The manifold forms 10 may be provided for use by law enforcement officers in separated units or as a loosely connected book wherein the stubs 27 or 32, for example, of the individual units are joined together for quick and easy separation at the time that a violation occurs. In either event, the arresting officer may support an entire book or an individual form 10 in one hand so that the summons sheet 14 is resting against and slightly cupped in the palm of the supporting hand. The necessary impressions are then applied by a writing instrument, such as a pencil or pen, in the proper places upon the front side of sheet 11, which is the complaint. These impressions are transferred to the front sides of the indicia sheets 12, 13 and 14 by the carbon sheets 17, 18 and 19, respectively. If the impressions are applied while the form is still connected to a book of forms, the stiff sheet 14 prevents the impression from being transferred to the next form in the book. When such written impressions have been completed, the stiff rear sheet 14, which is the summons, is then separated from the stub 27 along the severance line 25 and is served upon or handed to the traffic violator. The third carbon paper 19 can then be removed from the third indicia sheet 13 so that its exposed, transfer surface will not disfigure or mark up other documents, for example, with which it might otherwise come in contact.

The three remaining indicia sheets 11, 12 and 13, including their carbon papers 17 and 18 therebetween, are then returned to the police station intact. Upon arrival at the police station, the arresting officer removes a third indicia-bearing sheet 13 which is the record of the violation to be retained by the law enforcement agency to which the arresting officer is attached. At this time the second carbon paper 18 may be removed for the same reasons that the third carbon paper was removed.

The first and second indicia sheets 11 and 12, and the first carbon paper 17 disposed therebetween, are forwarded while still attached to the stub 27 to the appropriate court having jurisdiction over the violator and/or the violation. After the complaint has been disposed of by appropriate action of the court, the stub 27 and the remaining carbon paper 17 are simultaneously disconnected from the sheets 11 and 12. The carbon paper 17 is replaced between sheets 11 and 12 in the inverted position so that its impression-giving surface is against the reverse side of sheet 11. The clerk and judge can now enter on the reverse side of the sheet 12, by means of a pencil or pen, the information as indicated, which provides an abstract of the court's action in disposing of the case. When such entries are complete, the second sheet 12 is separated from the first sheet 11 along the severance line 21 and is forwarded to the state licensing authority for appropriate action thereby. Sheet 11 is retained by the court as a record not only of the complaint but the disposition of same.

While the foregoing description has specifically recited a manifold form having four indicia-bearing sheets, it will be apparent that additional sheets including appropriate indicia may be provided in each set, as desired or required. For example, an additional sheet having the same indicia on its front side as the complaint 11 may be provided for accounting control purposes, in which case indicia could be placed on the rear side of such added sheet appropriate to the needs of accounting control. In such case an additional carbon paper sheet would be provided.

Accordingly, it will be seen that by connecting sheets 11 and 12 together both at their upper and lower ends, and by making sheet 14 substantially thicker and stiffer than the other sheets, there is very little chance for the arresting officer to make a mistake as to which sheet is the summons and should be served upon the violator. Moreover, having served the summons upon the violator, the determination as to which sheet of the three remaining sheets is to remain as a record of the violation in the police department is also rendered obvious. Thus, it follows that there is no question as to which sheets must ultimately go to the court having jurisdiction over the complaint arising out of the violation.

At least some of the objects of the invention will be met by securing together the lower ends of the indicia-bearing portions 28 of the sheets 11 and 12 above the severance lines 22 and 23. Thus, these two sheets will still be connected when they are removed from the stub portion. Moreover, the indicia may be placed upon the indicia sheets 11 to 14, inclusive, so that the stub portion 27 is at the upper ends thereof. Furthermore, the indicia can be placed upon the portions 28 in a variety of different arrangements including lengthwise of the sheets.

Although a particular embodiment of the invention has been described above in detail for illustrative purposes, it will be recognized that variations or modifications of such disclosure, which lie within the scope of the appended claims, are fully contemplated.

What is claimed is:

A manifold traffic violation form including a summons, a police record, a complaint and a court record, comprising: at least three rectangular indicia-bearing sheets, said sheets being of substantially the same size and shape and each sheet having a pair of perforated severance lines substantially parallel with and near to the upper and lower edges thereof whereby each sheet is divided into an indicia-bearing portion and a pair of relatively small stub portions; another indicia-bearing sheet of substantially the same shape as, and of smaller length and stiffer than, the three indicia-bearing sheets said other sheet having a perforated serverance line parallel with and near to the lower end edge thereof whereby a stub portion is formed; means securing together the stub portions at the lower ends of said indicia-bearing sheets substantially along a line adjacent to the said lower end edges of each sheet and spaced from the severance line thereof, whereby said indicia-bearing sheets are held in a superimposed group with said other sheet at the back end of said group, the indicia-bearing portions of the first and second indicia-bearing sheets at the front end of said group being separably secured together along a line near their upper edges; means securing together the stub portions of said three indicia-bearing sheets at the upper ends thereof; at least three impression transferring sheets, one of said transferring sheets being disposed between each pair of adjacent indicia-bearing sheets, and each transferring sheet having one impression transferring surface facing said other sheet; means securing one edge of each transferring sheet to the stub portion of the adjacent indicia-bearing sheet at the lower end thereof; first indicia relating to the violator and the violation located on the inner side of the indicia-bearing portion of said other sheet and in registry on the corresponding sides of the other indicia-bearing sheets, said first sheet being identified as the complaint, the second sheet being identified as a copy for the state licensing authority, the third sheet being identified as a police record and the other sheet being indentified as a summons; second, substantially identical indicia in registry on the reverse sides of said first and second indicia-bearing sheets relating to the court's disposition of the complaint; third indicia on the reverse side of said third sheet relating to the police record; and fourth indicia on the reverse side of the other sheet relating to instructions for the violator.

References Cited in the file of this patent

UNITED STATES PATENTS

| | | | |
|---|---|---|---|
| 1,079,737 | Bannerman | Nov. 25, | 1913 |
| 1,673,309 | Bottle | June 12, | 1928 |
| 1,954,339 | Wilcox | Apr. 10, | 1934 |
| 2,163,714 | Stevens | June 27, | 1939 |
| 2,247,233 | Graham | June 24, | 1941 |
| 2,495,388 | Ryan | Jan. 24, | 1950 |
| 2,536,371 | Hutchinson | Jan. 2, | 1951 |